(12) United States Patent
Schoppmeier

(10) Patent No.: US 8,937,896 B2
(45) Date of Patent: Jan. 20, 2015

(54) POWER SAVING MODE FOR MULTI-CARRIER TRANSMISSION

(71) Applicant: Lantiq Deutschland GmbH

(72) Inventor: Dietmar Schoppmeier, Unterhaching (DE)

(73) Assignee: Lantiq Deutschland GmbH, Neubiberg (DE)

( * ) Notice: Subject to any disclaimer, the term of this patent is extended or adjusted under 35 U.S.C. 154(b) by 108 days.

(21) Appl. No.: 13/664,321

(22) Filed: Oct. 30, 2012

(65) Prior Publication Data

US 2013/0294304 A1    Nov. 7, 2013

Related U.S. Application Data

(60) Provisional application No. 61/553,224, filed on Oct. 30, 2011.

(30) Foreign Application Priority Data

Feb. 9, 2012 (EP) .................................. 12000838

(51) Int. Cl.
*H04L 12/12* (2006.01)
*H04W 52/02* (2009.01)

(52) U.S. Cl.
CPC .......... *H04L 12/12* (2013.01); *H04W 52/0238* (2013.01); *Y02B 60/50* (2013.01)
USPC ........................................................ 370/311

(58) Field of Classification Search
None
See application file for complete search history.

(56) References Cited

U.S. PATENT DOCUMENTS

| | | | |
|---|---|---|---|
| 6,721,355 B1 * | 4/2004 | McClennon et al. ......... 375/222 |
| 7,630,639 B2 * | 12/2009 | Kramer et al. .................. 398/72 |
| 2005/0254515 A1 * | 11/2005 | Suzuki et al. .................. 370/463 |
| 2008/0260011 A1 * | 10/2008 | Peeters et al. ................. 375/222 |
| 2009/0022213 A1 * | 1/2009 | Shi ................................. 375/219 |
| 2009/0086759 A1 * | 4/2009 | Heise et al. .................... 370/474 |
| 2009/0177938 A1 * | 7/2009 | Pons et al. ..................... 714/751 |
| 2012/0324262 A1 * | 12/2012 | Chang et al. .................. 713/320 |

FOREIGN PATENT DOCUMENTS

| EP | 2237470 A1 | 10/2010 |
|---|---|---|
| EP | 2391031 A1 | 11/2011 |

OTHER PUBLICATIONS

G.998.4 (Improved impulse noise protection for DSL transceivers; Jun. 2010).*

* cited by examiner

*Primary Examiner* — Hassan Kizou
*Assistant Examiner* — Tejis Daya

(57) ABSTRACT

Methods and communication devices are described where in a first transmission mode a set of carriers having different carrier frequencies is used for payload data transmission, and in a second transmission mode at least some of the carriers of the set of carriers are refrained from being used, and the transmission power is reduced.

18 Claims, 2 Drawing Sheets

POWER SAVING MODE FOR MULTI-CARRIER TRANSMISSION

RELATED APPLICATIONS

This application claims priority benefit of U.S. Provisional Application 61/553,224, filed Oct. 30, 2011. This application further claims priority benefit of European Patent Application 12000838.8, filed Feb. 9, 2012. The entire contents of the indicated earlier filed applications are incorporated herein by reference.

BACKGROUND

The present application relates to communication methods, communication devices and communication systems employing multi-carrier transmission with a power saving mode. In some embodiments, the application relates to corresponding methods, devices and systems also employing retransmission.

Multi-carrier transmission is nowadays employed widely in communication methods, systems and devices. In multi-carrier transmission, data is modulated onto a plurality of carriers having different frequencies, the carriers also being referred to as tones. One example for multi-carrier transmission is discrete multitone modulation (DMT) which is widely employed in DSL (Digital Subscriber Line) communication like ADSL and VDSL communication. Various versions of ADSL and VDSL, like VDSL, VDSL2, ADSL or ADSL2 are standardized by various ITU-T recommendations like G.991.x (x currently being 1 or 2) for HDSL, G.992.x (x currently ranging from 1 to 5) for various ADSL variants or G.993.x (x currently being 1 or 2) for VDSL. Other standards provide addition to such DSL transmission. For example, G.994.1 provides handshake procedures, and G.998.4 provides implementations for improved impulse noise protection including for example retransmission mechanisms where data which is not received correctly is sent again, i.e. is retransmitted. As the details of such systems are standardized, they will not be described again here in detail.

When transmitting data via multi-carrier transmission, each carrier is provided with a certain transmit power. Additionally, for example in some of the above-mentioned DSL standards low power modes have been defined which for example are able to reduce the overall transmit power when no data is to be transmitted. However, these conventional low power modes in some instances may be difficult to employ, for example if a DSL transmission is used for voice over IP (VoIP), i.e. for telephony applications, where some activity may always be required to ensure that a user is always reachable via telephone. Furthermore, in some cases the power saving obtained by such conventional low power modes may not be satisfying.

BRIEF DESCRIPTION OF THE DRAWINGS

In the following, embodiments will be described with reference to the attached drawings, wherein.

DETAILED DESCRIPTION

Figure 1:
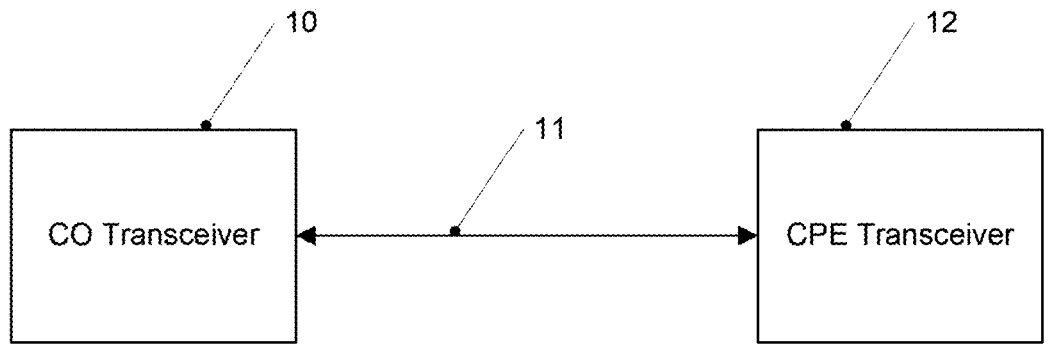
FIG. 1 is a block diagram of a system according to an embodiment.

There is a need for additional ways of implementing low power modes in multi-carrier transmission.

In a first aspect, an embodiment encompasses a method for multi-carrier data transmission, wherein carrier frequencies of each carrier of a set of carriers differ from one carrier to another. The method comprises using, in a first transmission mode, all carriers of the set of carriers for payload data transmission. The method further comprises using, in a second transmission mode, refraining from transmitting payload data on at least one of the carriers of the set of carriers. At least one effect is that, in the second transmission mode, transmission power can be reduced on those carriers of the set of carriers that are not used for transmission of payload data. Consequently, in an embodiment in the first aspect, in the second transmission mode, transmission power of the at least one of the carriers is reduced. In an embodiment according to he first aspect, in the second transmission mode, none of the carriers in the set of carriers is used for transmission of payload data.

In an embodiment, in the second transmission mode, transmitting payload data on at least some of the carriers of the set of carriers is refrained from. In an embodiment, transmission power of the at least some of the carriers is reduced.

In an embodiment, the method may be employed in a system using retransmission, where data transfer units which are not received correctly at a far end may be sent again. In such a system, the second transmission mode may for example be used if idle data transfer units are detected. The at least some of the carriers may in particular be carriers which otherwise would only be used for transmitting idle data transfer units.

A switching between first and second transmission mode may be made based on an amount of data or a type of data to be transmitted.

In some embodiments, discrete multitone modulation may be used, and data transfer units may be aligned with discrete multitone symbols, such that by idle DTUs idle symbols are created and thus the at least some of the carriers may be easily identified.

In some embodiments, data transfer units may be identified if idle if they do not contain data from layers above a TPS-TC (Transmission Protocol-Specific Transmission Convergence) layer which is located above a retransmission layer and which may perform a rate decoupling.

In some embodiments, a further set of carriers having different carrier frequencies may be used for transmitting control data, for example control data from the TPS-TC layer or below. In such an embodiment, payload data which in the first transmission mode is transmitted on the set of carriers e.g. infrequent keep-alive packets in the second transmission mode may be transmitted via the further set of carriers. Such payload data may in particular comprise control data from higher layers above the TPS-TC layer. In such an embodiment, transmission power may be reduced in case for example only some control data from higher layers are to be transmitted as payload data, and some control data may then be sent via the further set of carriers. The further set of carriers may for example correspond to a first latency path, and the set of carriers may correspond to a second latency path.

Reducing transmission power may comprise reducing the transmission power to zero or essentially zero or still a small non-zero gain may be assigned such that the carriers are switched to monitoring carriers.

Communication devices, for example transceivers like DSL transceivers employing one or more of the above methods are also disclosed.

In a second aspect, an embodiment encompasses a communication device for multi-carrier data transmission. The device comprises communication circuitry which is configured to use, in a first transmission mode, a first set of carriers for payload data transmission. The communication circuitry is further configured to use, in a second transmission mode, a second set of carriers for payload data transmission. The second set of carriers is a subset of the first set of carriers. The second set of carriers does not comprise at least one of the carriers of the first set of carriers. An effect of an embodiment in the second aspect is that power savings can probably be made. In an embodiment according in the second aspect, in the second transmission mode, transmission power of the at least one carrier of the first set of carriers that is not comprised in the second set of carriers is reduced with respect to that carrier's transmission power in the first transmission mode.

In an embodiment according to the second aspect the communication device comprises a TPS-TC layer, a retransmission layer below the TPS-TC layer and a PMS-TC layer below the retransmission layer. The PMS-TC layer comprises a first latency path for overhead data and a second latency path for data received from the retransmission layer at least in the first transmission mode.

In an embodiment in the second aspect the communication device is configured to perform the method according in the first aspect.

In the following, embodiments will be described in detail. It should be noted that the embodiments described are not to be construed as limiting, as the embodiments may also be implemented in other ways as described. For example, features from different embodiments may be combined with each other unless specifically noted otherwise. On the other hand, describing an embodiment with a plurality of features is not to be construed as indicating that all those features are necessary for practicing the embodiment, as other embodiments may comprise less features and/or alternative features.

Furthermore, while in the present application specific terms are used which for example designate specific entities or layers in various DSL-related standards, these technical terms are to be construed as encompassing also entities or layers performing the same or equivalent functions, even if they do not bear the same name for example in associated standards or literature.

Turning now to the figures, in FIG. 1 a communication system according to an embodiment is illustrated.

The embodiment of FIG. 1 comprises a first transceiver 10 and a second transceiver 12 which communicate via a communication channel 11 with a multi-carrier communication using a plurality of carriers having different frequencies. The carriers will also be referred to as tones hereinafter. In some embodiments, transceivers 10 and 12 may be DSL transceivers like ADSL transceivers or VDSL transceivers operating according to the appropriate ADSL or VDSL standard as described in the introductory portion, and communication channel 11 may be a wire-bound communication channel using for example a twisted pair of copper lines. However, in other embodiments, transmission channel 11 may be a wireless channel. In case of DSL transmission, as multi-carrier communication usually discrete multitone modulation (DMT) is employed. Transceiver 10 in some embodiments may be central office (CO) equipment, while transceiver 12 may be located in customer's premises (CPE).

Transceiver 10 and 12 may employ a low power mode where at least some of the carriers are not used for payload data transmission and reduced in power, as will be described in more detail further below.

In some embodiments transceivers 10 and 12 may employ impulse noise protection, for example retransmission, in one or both communication directions. In particular in case of DSL communication the impulse noise protection may be as defined in ITU-T recommendation G.998.4, in particular as defined there at the filing date of the present application.

Figure 2:
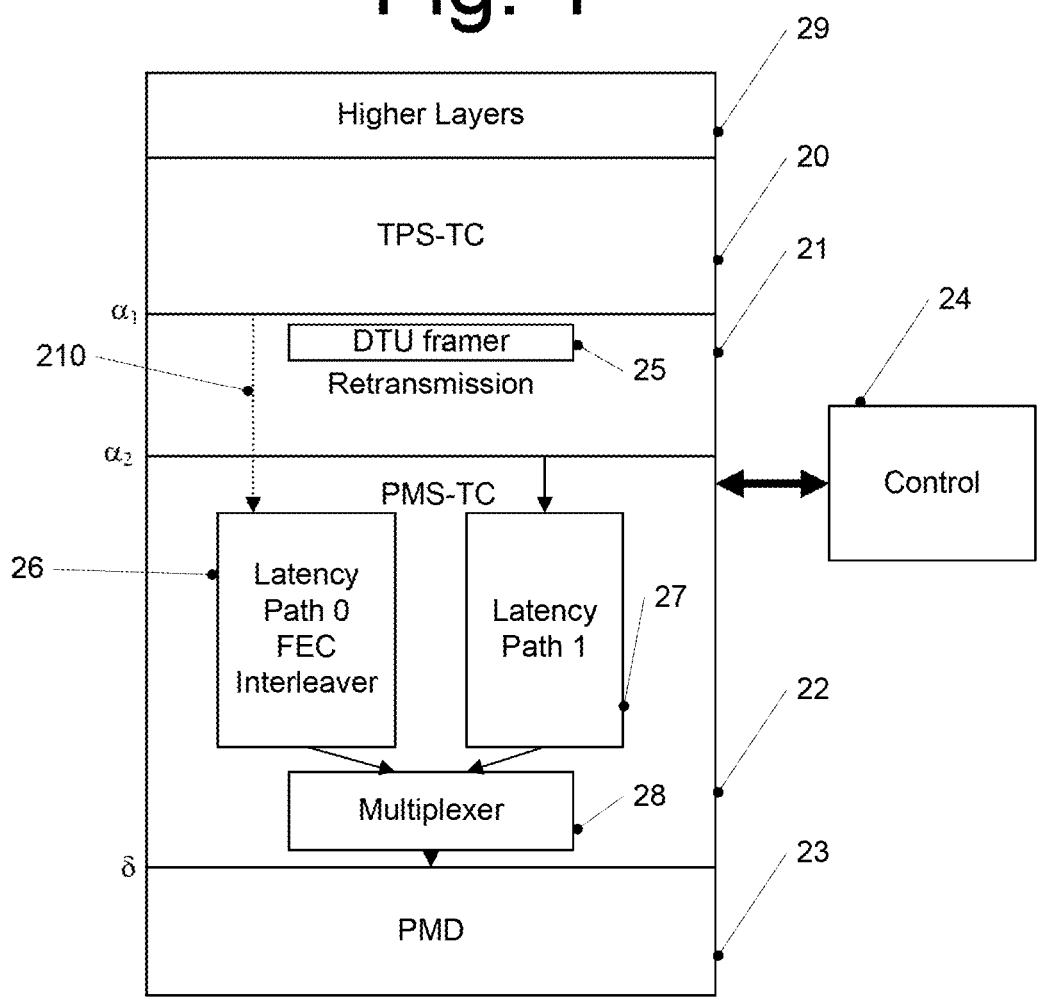
FIG. 2 is a block diagram showing a layer structure of a communication device according to an embodiment.

In FIG. 2 an implementation of a communication device like transceiver 10 or transceiver 12 according to an embodiment represented as a layer model is shown. It should be noted that the layer model in FIG. 2 is represented in a simplified manner, and other elements conventionally employed, in particular elements employed according to various standards, may be used.

In case the respective transceiver operates as a DSL transceiver using impulse noise protection according to G.998.4, apart from a control 24 and associated functions for a power saving mode as described hereinafter the layer model represented may be taken as a simplified version of the layer model defined in these standards.

In FIG. 2 layers 22-23 are sublayers of a physical (PHY) layer, and one or more higher layers 29 like a data link layer are arranged above this physical layer, in particular above a TPS-TC sublayer 20 (Transmission Protocol Specific Transmission Convergence). In some embodiments, TPS-TC sublayer 20 performs a rate decoupling and provides data with a constant data rate via an $\alpha_1$ interface to a retransmission layer 21. For example, if the TPS-TC sublayer 20 receives data at a non-constant data rate, receives data only intermittently or receives no data from the higher layers 29, TPS-TC sublayer 20 may insert idle data to provide a data stream with a constant data rate to retransmission layer 21. Retransmission layer 21 comprises a DTU framer 25 where the data received from TPS-TC sublayer 20 is arranged in data transfer units (DTU) which are for example assigned a specific sequence index. If a data transfer unit is not received correctly at a far end (for example if in FIG. 2 DTUs from transceiver 10 are not correctly received at transceiver 12 or vice versa), a retransmission request may be sent back identifying the corrupt data transfer unit (DTU) by its sequence index, and this DTU is then transmitted again, i.e. retransmitted.

As mentioned above, TPS-TC layer 20 to provide a constant data rate may insert idle data, which may result in DTUs containing only such idle data. Such DTUs will be referred to as idle DTUs in the following, i.e. such idle DTUs may comprise data originating from the TPS-TC sublayer 20 (for example the above-mentioned idle data) but no data originating from higher layers 29.

Below retransmission layer 21 is a physical media-specific transmission convergence (PMS-TC) layer 22 which comprises at least two latency paths. A first latency path 26, also referred to as latency path 0 hereinafter, is used for an overhead channel which may for example comprise data for an embedded operation channel (eoc). This latency path may be protected against impulse noise for example by forward error correction (FEC), for example by Reed-Solomon encoding, and by interleaving. In contrast thereto, the data transfer units generated in retransmission layer 21 are transmitted via a second latency path 27 (also referred to as latency path 1) which in the example shown does not employ interleaving, but may employ forward error correction. As first latency path 26 employs interleaving, it generally has a higher latency than second latency path 27. In other embodiments, first latency path 26 may operate without interleaving, e.g. when the rate of data to be sent via the first latency path is low, and/or the second latency path 27 may employ interleaving.

It should be noted that PMS-TC layer 22 may comprise further latency paths (not shown), for example an additional latency path for retransmission request channels which is used for standing retransmission requests.

A multiplexer 21 combines the data of the latency paths 26, 27. The data is then forwarded via the so-called δ-interface to a physical media dependent (PMD) layer 23 for transmission.

In the embodiment shown, of the carriers available for data transmission a first set of carriers is used for transmitting data assigned to latency path 0 and a second set of carriers are assigned to transmit data of second latency path 27. In other words, different carriers or tones are used for the first latency path 26 and the second latency path 27. The data transmitted via latency path 1 during regular transmission (for example outside a low power mode according to some embodiments) is also referred to as payload data hereinafter, wherein this payload data may also comprise control data from higher layers 29 and/or infrequent so-called keep-alive packets.

In the embodiment of FIG. 2 a control 24 is provided which controls switching between regular transmission and a low power mode which will be described in the following. It should be noted that while control 24 is depicted as separate entity in FIG. 2, it may be incorporated in one or more of the layers shown in FIG. 2. Control 24 in an embodiment may monitor if idle DTUs are generated and, if idle DTUs are generated, issue instructions not to use all or some of the carriers of latency path 1, in particular carriers which otherwise would only serve to transmit an idle DTU, and reduce their power. For example, the power of these carriers may be set to essentially zero (for example an associated gain may be set to zero), or the power may be reduced (for example an associated gain may be reduced). For example, the gain to a fixed standardized value for all corresponding carriers, for example −12 dB, or to carrier-specific values depending on a signal-to-noise ratio at a far end side such that the carriers may be used as monitoring subcarriers. In such a case still no bits will be loaded on these carriers, and a gain greater than zero will be used (for example in a DSL communication according to G.993.2 $g_i$ values between 0.1888 and 1.33 linear scale corresponding to −14.5 dB to +2.5 dB.

If idle DTUs are detected by control 24, in case the DTUs are not aligned with symbols modulated onto the carriers, for example DMT data symbols in case of DSL, it is necessary to determine those carriers of a particular symbol which correspond to the idle DTU and to refrain from using these carriers and reduce their powers. In an embodiment, however, DTU boundaries are aligned with symbol boundaries, such that for example a complete symbol only corresponds to an idle DTU and therefore all carriers may be disabled. In particular, for example the alignment is fulfilled if the DTU size in symbols is an integer value greater than zero or else the reciprocal DTU size is an integer value. For example, in some DSL standards, for example G.998.4, the DTU size is limited to a range between 0.5 and 4 symbols. An alignment may be reached by choosing a size of 0.5, 1, 2, 3 or 4 symbols. In the last cases, i.e. with a DTU size of one or more complete symbols, the complete symbol corresponds to an idle DTU and in this case all carriers of latency path 1 in the case of FIG. 2 may be refrained from being used and reduced in power.

It should be noted that while in the embodiment of FIG. 2 control 24 checks if idle DTUs are present, in other embodiments which do not use DTUs it may in general be checked if for example a data stream used for generating data symbols comprises redundant bits or otherwise bits or data not containing any non-redundant information and to refrain from using corresponding carriers. In other words, in the embodiment of FIG. 2, idle data, i.e. data only inserted for providing a constant data rate, are not transmitted to the receiving side, and carriers which would be needed for such a transmission are reduced in power and refrained from being used.

The above refraining of using certain carriers and reducing the power above corresponds to a low power mode of operation which may be implemented instead or in addition to other low power modes implemented for a certain system. It should be noted that this low power mode may be entered for individual idle DTUs in some embodiments. In other embodiments, this low power mode may only be entered if only idle DTUs are formed for a predetermined period of time, for example to prevent a switching of mode for every or for every few DTUs.

As mentioned above, in some embodiments the DTUs may comprise control data from higher layer 29. In such a case it may happen that even if no other payload data is to be transmitted through the control data from higher layers which need to be transmitted the carriers assigned to second latency path 27 may not be refrained from being used for a longer period of time in the embodiments discussed so far. In some embodiments, however, as indicated by dashed arrow 210, in the low power mode some data, in particular control data, may be transmitted via latency path 0. In this case, as also indicated by dashed arrow 210, such data may be directly received by latency path 0 from the TPS-TC layer without any DTU framing for retransmission. In other embodiments, also a small amount of payload data assigned to services like VoIP, e.g. an amount below a predetermined threshold value and/or DTUs may possibly be transmitted via latency path 0, and latency path 1 may be deactivated in a low power mode.

In some embodiments, in this case the TPS-TC sublayer 20 may even be deactivated, and the control data may be directly received from the higher layer. For example, in some embodiments the PMS-TC may receive data packets of up to five hundred bytes, and in case the control data or other data from the higher layer 29 which are to be received does not exceed this value, the TPS-TC layer 20 may be deactivated.

In such a case, in some embodiments the carriers of latency path 0 may be split between transmitting the data received as indicated by dashed arrow 210 and carriers used for transmitting the "usual" overhead data which is also transmitted via first latency path 26 during regular transmission.

Also this may be performed if for at least a predetermined time only data below predetermined threshold is received from higher layer 29, for example only control data. It should be noted that other low power modes, like the L2 power mode defined in some standards, in such cases may be used if only data requiring a comparatively low bandwidth is to be transmitted, for example VoIP data or data associated with other low data rate services. In this case, for example the delay of such an additional power mode may be limited.

In case of carriers assigned to second latency path 27 are refrained from being used, in some embodiments components associated with transmitting data of this latency path in the various layers shown may be deactivated to increase power saving.

Figure 3:
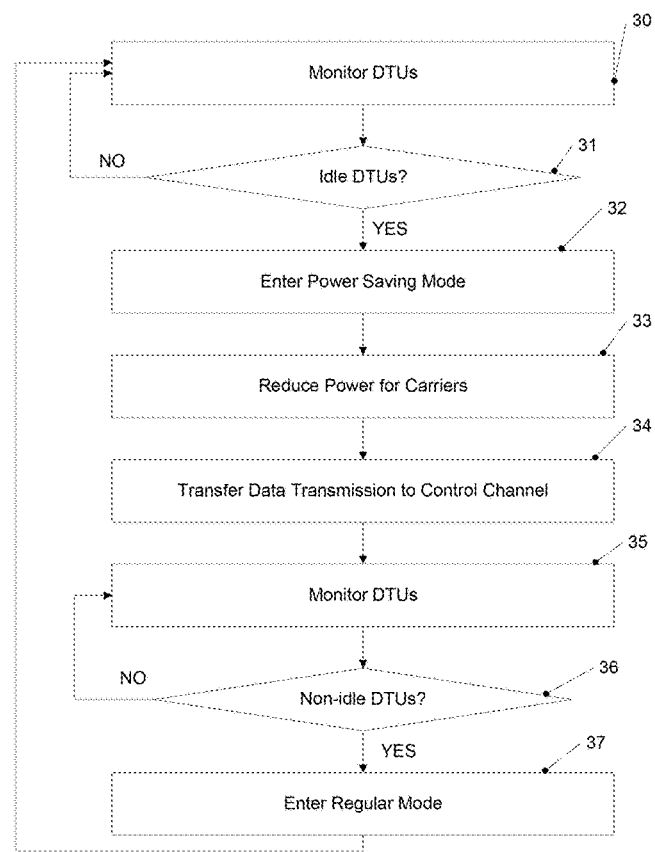
FIG. 3 shows a flowchart representing a method according to an embodiment.

Turning now to FIG. 3, a method according to an embodiment will be described. The method may for example be implemented in the embodiment of FIG. 1 or FIG. 2, but may also be used independently therefrom. It should be noted that all details and variants of saving power and refraining from using some carriers discussed with reference to FIG. 2 may also be used with the method of FIG. 3, such that these features will not be discussed again in detail.

At 30 in FIG. 3, data transfer units (DTUs) are monitored, and at 31 it is checked if idle DTUs occur. For example, it may be checked if single idle DTUs occur, or if idle DTUs occur for a predetermined time period. If no idle DTUs are detected, the monitoring is continued at 30. If idle DTUs are detected, at 32 a power saving mode is entered. In other embodiments, the amount and/or type of data to be transmitted (payload data or general traffic data) may be monitored, and the entering of the power saving mode may be made based on the amount and/or type. To enter the power saving mode, for example a specific message may be sent, for example on the overhead channel of latency path 0 in the embodiment of FIG. 2. This message in some embodiments may have an intermediate priority.

At 33, the power for carriers which would be associated with the idle DTUs is reduced, for example set to zero or set to a predetermined value, and these carriers are refrained from being used for actual data transmission. At 34 optionally, as also explained with reference to FIG. 2, data transmission of payload data, in particular control data from higher layers, may be transferred to a latency path which is otherwise, i.e. in a regular mode, used for a control channel like an overhead channel as discussed with reference to FIG. 2.

While in the power saving mode, at 35 the monitoring of the DTUs is continued, and if at 36 no idle DTUs or data in an amount which cannot be transferred to the control channel is detected, at 37 the regular transmission mode where the carriers for which power was reduced at 33 are used again if entered.

It should be noted that while the method is described with reference to FIG. 3 as a series of acts ore events, in other embodiments some of the actions described may be performed in parallel to other actions, for example the monitoring may be performed continuously while the other acts or events described occur.

As can be seen, a plurality of modifications are possible, and therefore the present application is not to be construed as being restricted to the specific embodiments described.

What is claimed is:

1. A method for multi-carrier data transmission, wherein carrier frequencies of each carrier of a set of carriers differ from one carrier to another, comprising:
   using, in a first transmission mode, all carriers of the set of carriers for payload data transmission, and
   in a second transmission mode, refraining from transmitting payload data on at least one of the carriers of the set of carriers and reducing transmission power of the at least one of the carriers,
   using, in the first transmission mode, a further set of carriers different from the set of carriers and having different carrier frequencies for transmission of overhead data, and
   in the second transmission mode transmitting a load data via the further set of carriers which, in the first transmission mode, would be transmitted via the set of carriers.

2. The method of claim 1, further comprising:
   switching between the first transmission mode and the second transmission mode based on an amount and/or type of data to be transmitted.

3. The method of claim 2, wherein the method further comprises:
   providing a retransmission layer, providing a TPS-TC layer performing a rate decoupling above the retransmission layer, the retransmission layer generating data transfer units,
   identifying data transfer units as idle if they do not contain data from layers above the TPS-TC layer, and
   switching from the first transmission mode to the second transmission mode based on identified idle data transfer units.

4. The method of claim 3, wherein the multi-carrier transmission is discrete multitone modulation, the method further comprising:
   aligning data transfer units with discrete multitone symbols.

5. The method of claim 3,
   wherein the method is performed according to ITU-T G998.4.

6. The method of claim 1, wherein reducing transmission power for at least some of the carriers comprises switching off the at least some of the carriers.

7. The method of claim 1, wherein reducing transmission power for at least some of the carriers comprises setting gains of the at least some of the carriers to a predetermined value or to values depending on a signal-to-noise-ratio at a receiver side.

8. The method of claim 1, wherein the payload data transmitted via the further set of carriers in the second transmission mode comprises control data from layers higher than a TPS-TC layer and/or service data in an amount below a threshold value.

9. The method of claim 8, wherein the control data is provided to the further set of carriers without using at least one of a TPS-TC layer and a retransmission layer.

10. The method of claim 1, wherein the further set of carriers transmits data processed via a first latency path including forward error correction and the set of carriers is used for transmitting data processed via a second latency path.

11. The method of claim 1, further comprising sending a control message when switching between the first transmission mode and the second transmission mode.

12. A communication device for multi-carrier data transmission, comprising communication circuitry which is configured to use,
   in a first transmission mode, a first set of carriers for payload data transmission, and a further set of carriers different from the first set of carriers for overhead data transmission,
   and,
   in a second transmission mode, a second set of carriers for payload data transmission,
   wherein the second set of carriers is a subset of the first set of carriers that does not comprise at least one of the carriers of the first set of carriers,
   wherein, in the second transmission mode, transmission power of the at least one carrier of the first set of carriers that is not comprised in the second set of carriers is reduced with respect to transmission power in the first transmission mode, and
   wherein, in the second transmission mode, payload data is transmitted via the further set of carriers which, in the first transmission mode, would be transmitted via the first set of carriers.

13. The communication device of claim 12, wherein the communication device comprises a TPS-TC layer, a retransmission layer below the TPS-TC layer and a PMS-TC layer below the retransmission layer, the PMS-TC layer comprising a first latency path for overhead data and a second latency path for data received from the retransmission layer at least in the first transmission mode.

14. A method, comprising:
   allocating, by a communication device, a set of carriers for use for communication of data;
   communicating data, in a first transmission mode, on all carriers associated with the set of carriers; and
   communicating data, in a second transmission mode, on less than all carriers associated with the set of carriers, providing a retransmission layer, providing a TPS-TC layer performing a rate decoupling above the retransmission layer the retransmission layer generating data transfer units, identifying data transfer units as idle if they do not contain data from layers above the TPS-TC layer, and switching from the first transmission mode to the second transmission mode based on identified idle data transfer units.

15. The method according to claim 14, wherein the data is payload data comprising control data from one or more layers above the TPS-TC (Transmission Protocol-Specific Transmission Convergence) layer.

16. The method according to claim 14, further comprising reducing power, in the second transmission mode, associated with one or more of the carriers of the set of carriers.

17. The method according to claim 14, further comprising switching between the first transmission mode and the second transmission mode based on an amount and/or type of data to be transmitted.

18. The method according to claim 16, reducing transmission power comprises setting gains of the one or more of the carriers of the set of carriers to a predetermined value or to values depending on a signal-to-noise-ratio at a communication device.

* * * * *